ns Patent [19]

Tamamori

[11] Patent Number: 4,949,754
[45] Date of Patent: Aug. 21, 1990

[54] PRESSURE CONTROL VALVE FOR RAILWAY VEHICLES
[75] Inventor: Hideo Tamamori, Kita, Japan
[73] Assignee: Nippon Air Brake Co., Ltd., Kobe, Japan
[21] Appl. No.: 278,388
[22] Filed: Dec. 1, 1988
[30] Foreign Application Priority Data
Dec. 15, 1987 [JP] Japan ................. 62-190597
[51] Int. Cl.$^5$ .......................... G05D 16/00
[52] U.S. Cl. .............. 137/627.5; 137/596.18; 137/85
[58] Field of Search ............. 137/627.5, 596.18, 116.5, 137/85, 102; 303/40
[56] References Cited
U.S. PATENT DOCUMENTS

| 2,716,017 | 8/1955 | Linker ................ 251/331 |
| 2,825,361 | 3/1958 | Seljos ............... 137/596.18 |
| 2,958,337 | 11/1960 | Holbrook ........... 137/596.18 |
| 4,724,859 | 2/1988 | Nakao .............. 137/627.5 X |

Primary Examiner—Alan Cohan
Attorney, Agent, or Firm—J. B. Sotak

[57] ABSTRACT

A railway car pressure control valve having an adjustable middle body member. An air supply chamber connected to a source of compressed air and an output chamber connected to an output passage. An exhaust chamber opened to the atmosphere. An air supply valve spring biased toward a valve seat. A hollow exhaust valve rod having a valve tip located adjacent the air supply valve. A control piston including a control piston diaphragm is attached to the inside wall of the main valve body. A balance piston including a balance piston diaphragm attached to the inside wall of the main valve body. A plurality of first and second radially extending fins carried by the balance piston and the inside wall of the main valve body, respectively. A protective member interposed between the balance piston diaphragm and the radially extending fins to prevent wave distortion of the balance piston diaphragm and preclude increase resistance to movement of the main piston.

10 Claims, 3 Drawing Sheets

PRESSURE CONTROL VALVE FOR RAILWAY VEHICLES

FIELD OF THE INVENTION

This invention relates to a pressure control valve such as a relay valve, load-dependent response valve, three pressure type control valve or the like, which may be used in the air brake systems of railway cars, and in particular to an improved pneumatic pressure control valve for railway vehicles in which a protective member which may be a spiral or concentric wire circle is located between the balance piston diaphragm and a plurality of radially extending fins carried by the balance piston and the inner wall of the main valve body to prevent undulated waves that result in the increase of the deformation resistance.

BACKGROUND OF THE INVENTION

A pressure control valve for use in railway car brake systems is shown and disclosed in my copending U.S. patent application Ser. No. 07/278,518, concurrently filed herewith, and one embodiment will presently be explained with reference to the accompanying FIGS. 3 and 4 of the drawings. It will be noted that the pressure control valve shown in FIGS. 3 and 4 includes a middle body member 31 and a main piston 32 located in the main valve body 30. The valve includes an air supply chamber 41, an output chamber 42, an exhaust chamber 43, an air supply valve 44, an exhaust valve rod 45, a balance piston 46, and a control piston 47.

The external shape of the middle body 31 takes the form of a short cylinder which is fitted and situated in the inner opening 48 formed in the upper part of the main valve body 30 so that it can be shifted vertically or moved up and down therein. As shown, the air supply chamber 41 is formed in the middle body member 31, and there is a valve seat 50 at the air supply passage 49 which extends downwardly toward the outlet chamber 42. The air supply valve 44 is located in the member 31 and is biased by the compression spring 51 so that it is urged onto the valve seat 50. The air supply chamber 41 is connected to a suitable source of air pressure via a supply passage 52 which is formed in the right side of the main valve body 30, as shown in FIG. 3. The air supply chamber 44 is provided with a central vent passage 54 which leads the back vent chamber 53 formed at the top thereof. The bottom of the passage 54 ends in the vicinity of the air supply passage 49.

The lower end of the middle body member 31 communicates with the output chamber 42. The output chamber 42 is connected to the brake cylinder of the brake system via the delivery passage 55 formed in the main valve body 30 as shown in FIG. 3. A vent passage 56 is connected from the output chamber 42 to the space located above the middle body member 31, namely, the vent chamber 48. Alternately, the vent chamber 48 can be opened to the atmosphere via a vent hole which may be formed in the top of the main valve body 30 so that the passage 56 may be omitted.

As shown in FIG. 3, an adjusting screw 57 may be screwed into a threaded hole formed in the top of the main valve body 30. The exterior of the screw 57 may be manually turned and adjusted to a desired position. A biasing spring 58 engages the underside of the middle body member 31 and urges the body member 31 upwardly against the tip of screw 57. That is, the rotatable screw 57 fits into the top of the main valve body 30 and extends from the outside to the inside of the inner chamber 48 so that its tip touches the top of the middle body member 31. As shown, the compressed return spring 58 is caged between the main piston 32 and the middle body member 31. Thus, the middle body member 31 can be moved to the desired position simply by rotating the screw 57 from outside which together with the biasing spring 58 fixes it in that position.

The main piston 32 is positioned in the internal opening 59 formed in the lower section of the main valve body 30. The main valve body 30 consists of the balance piston portion 60 which is integral with the lower end of the exhaust valve rod 45. The main valve body 30 also includes a control piston portion 61. Thus, the balance piston 46 includes the portion 60 and a flexible diaphragm 62 which has its inner periphery attached to the piston portion 60 and has its outer periphery attached to the wall of the internal opening 59. Similarly, the control piston 47, includes portion 61 and a flexible diaphragm 63 which has its inner periphery attached to the piston portion 61 and has its outer periphery attached to the wall of the internal opening 59. A first plurality of radially extending fins 64 are attached to the main body 32 while a second plurality of radially extending fins 65 are attached to the inner wall of the opening 59. It will be seen that the fins 64 include upper edges 74 while the fins 65 include upper edges 75.

The flared rim or valve tip 66 of the exhaust valve rod 45 is located adjacent the air supply valve 44 on the side of the output chamber 42. The outside diameter of the periphery of the valve tip 66 is essentially equal to the inside diameter of the rear chamber 53 formed above the air supply valve 44. As shown in FIG. 3, the exhaust valve rod 45 is provided with an exhaust port 67. One end of the exhaust hole 67 opens at the valve tip 66 and the other end opens at the exhaust chamber 43 which is opened to the atmosphere via exhaust passage 72.

As shown, the lower portion of the exhaust valve rod 45 is integrally formed by a guide and stabilizing collar 68 which is joined to the balance piston main body 60 and the control piston main body 61 moves in unison with the exhaust valve rod 45. In viewing FIG. 3, the direction of movement is in a vertical manner, and the lower collar 68 fits into the lower guide portion 76 of the main valve body 30 so that it can freely slide therein. As noted above, the inner rim of the diaphragm 62 is attached to the outside circumference of the balance piston main body 60 while the outer rim or periphery is attached to the inner wall of the internal opening 59 of the main valve body 30. In addition, the inner rim or periphery of the diaphragm 63 is connected to the lower extremity of the control piston main body 61 while the outer rim or periphery is attached to the inner wall of the internal opening 59 of the main valve body 30. Preferably, these diaphragms 62 and 63 are made of flexible rubber-like material. The inside of the internal opening 59 is divided into a balance chamber 69, the exhaust chamber 43, and a control chamber 70 as viewed from the top in FIG. 3. The chambers 69, 43 and 70 are made air tight by the diaphragms 62 and 63. The balance chamber 69 is connected to the output chamber 42 by a passage 71. The exhaust passage 72 is connected to the exhaust chamber 43 which passes through the outer left wall of the main valve body 30. The control passage 73 into which the control air pressure is introduced is fed to the control chamber 70. The passage 73 is formed in the outer right wall of the main valve body 30. As previously noted, the first fins 64 are formed on the outer circumference wall of the balance piston main body 60 and extend in the radial direction, as shown in FIG. 4. The outer edges of fins 64 extend nearly to the inner surface of the internal opening 59. The upper edges 74 which face the diaphragm 62 form a straight inclined downwardly and outwardly surface as shown in FIG. 3. The second radial fins 65 extend from the wall of the internal opening 59 of the main valve body 30, as can be seen in FIG. 4. The second fins 65 enter or interleave between each of the first fins 64. The upper edge 75 which is adjacent the underside of the diaphragm 62 forms a straight surface which inclines downwardly and inwardly as shown in FIG. 3. The upper edges 74 of the first fins 64 and the upper edges 75 of the second fins 65 are interposed between the balance piston main body 60 and the wall of the internal opening 59. This intersection line between the fins forms a concentric circle with the balance piston main body 60 so that the diameter of the circle of the intersection line changes with the movement of the piston main body 60 in the axial direction.

As indicated in FIG. 3, the pressure control valve is in an overlap condition. In the overlap state, the valve tip 66 of the exhaust valve rod 45 is in contact with the air supply valve 44, and at the same time the air supply valve 44 seats on the valve seat 50. In other words, the output chamber 42 is shut-off from the air supply chamber 41 and also from the exhaust chamber 43.

In this overlap state, when the control air pressure P1 in the control chamber 70 is reduced, the control force exerted by the control piston 47 becomes less than the balance force exerted by the balance piston 46 so that the piston 32 moves downwardly as viewed in FIG. 3. When the valve tip 66 of the exhaust valve rod 45 moves away from the air supply valve 44, the output chamber 42 becomes opened to the atmosphere via the exhaust hole 67 and the exhaust chamber 43. By this exhausting action, the output air pressure P2 in the output chamber 42 decreases. Now when the balance force drops and reaches equilibrium with the control force, it again resumes the overlap state. When the control air pressure P1 is decreased to atmospheric pressure, the output air pressure P2 also becomes atmospheric pressure.

In the overlap condition, when the control air pressure P1 increases, the control force becomes greater than the balance force, and the piston 32 moves upwardly as shown in FIG. 3. The exhaust valve rod 45 pushes upwardly and causes the air supply valve 44 to be separated from the valve seat 50. Thus, the air pressure is supplied from the air supply chamber 41 to the output chamber 42 via the air supply passage 49. After the output air pressure P2 rises as a result of this air pressure, and when the balance force increases to balance with the control force, it again reverts to the overlap condition.

Thus, with this pressure control valve, the output air pressure P2 can be made to correspond to P1 simply by changing the control air pressure P1. As noted above, the output air pressure P2 may be used to operate a vehicle brake system.

The presently described pressure control valve is characterized by the fact that the output air pressure P2 is controlled by the control air pressure P1 which can be changed by moving the position of the middle body member 31 vertically as shown in FIG. 3.

The effective area of the control piston 47, which includes the control piston main body 61 as well as the diaphragm 63, is S1 while the effective area of the balance piston 46, which includes the balance piston main body 60 and the diaphragm 62, is S2. When it assumes the overlap state indicated after the control air pressure P1 has been exerted on the control chamber 70, then the output air pressure P2 in the output chamber 42, can be indicated by the following equation:

$$P2 = (S1/S2) \times P1$$

since the force of the return spring 58 is less than the force of the piston caused by the air pressure.

Here, the effective area S2 of the balance piston is the area where the cross-sectional area of the valve tip 66 and the exhaust hole 67 of the exhaust valve rod 45 is subtracted from the area inside the circle of the above-mentioned intersecting line. In other words, inside the above-mentioned intersection line, the diaphragm 62 touches the first radial fins 64 extending from the balance piston main body 60. The force due to the pressure in the balance chamber 69 is transferred to the balance piston main body 60 inside this circle. However, outside this circle, it contacts the second radial fins 65 protruding from the main valve body 30, so that the work force due to the pressure of the balance chamber 69 is transferred to the side of the main valve body 30 and does not reach the balance piston main body 60.

This pressure control valve can change the effective area S2 of the balance piston by moving the position of the middle body member 31 by the adjusting screw 57. In other words, the position of the middle body member 31 can be changed by rotating the adjusting screw 57 so that it moves member 31 vertically. For example, if the adjusting screw 57 is moved upward, the middle body member 31 is moved upwardly by the force of the biasing spring. If the middle body member 31 is raised to the position indicated by the phantom line 31a, the valve tip 66 of the exhaust valve rod 45 rises that much in order to retain the overlap condition, so that the balance piston main body 60 which is integrally connected to the exhaust valve rod 45 and the control piston main body 61 also rises. Therefore, in the overlap condition after the position of the middle body member 31 has changed, the diameter of the circle of the intersection line related to the effective area S2 of the above-mentioned balance piston increases so that the effective area S2' becomes larger than the previous effective area S2. The character 64a shows the position of the first radial fins in the overlap condition after the position of the middle body member 31 has been changed.

The change of the effective area of the balance piston from S2 to S2' means that the above-mentioned effective area ratio S1/S1 will be changed to S1/S2' so that the characteristic of the output air pressure P2 in relation to the control air pressure P1 can be varied.

In the above-mentioned pressure control valve, the upper edges 74 and 75 of the corresponding first and second radial fins 64 and 65 adjacent the underside of diaphragm 62 slope in a downward direction. However, in practice one of the upper edges 74 or 75 of the fins can be disposed horizontally, namely, in the direction perpendicular to the axis of the piston 32. In other words, in any case, the effective area of the balance piston 46 in the overlap condition can be varied by changing the position of the middle body member 31, and the effective area ratio of control piston 47 and the balance piston 46 can be modified.

In addition, instead of the structure in which the fins are placed on the side of the main valve body 30 corresponding to the balance piston main body 60, the equivalent of the first fins 64 and the second fins 65 can be placed adjacent the side of the control piston 47, or they can be provided on both sides so that the effective area ratio of the control piston 47 and the balance piston 46 can be changed in the same way.

As shown in FIG. 4, the diaphragm 62 is in contact with the upper edges of the first fins 64 and the second fins 65 of the pressure control valve. That is, the air pressure on the upper side of the diaphragm 62 pushes the underside against the upper edges of the fins 64 and 65. Thus, the diaphragm 62 is deformed so that it takes on an undulating shape. The concave and convex portions of this wave shape are opposite on either side of a boundary which is the circle 77 of the intersecting line. The inner peripheral surface of the diaphragm 62 engages the upper edges 74 of the first fins 64 and the outer peripheral surface of the diaphragm 62 engages the upper edges 75 of the second fins 65. Thus, the diaphragm 62 is supported by the first fins 64 on one side of circle 77 and is supported by the second fins 65 on the other side of circle 77. In other words, a space exists between the first fins 64 on the one side and a space exists between the second fins 65 on the other side. Thus, the diaphragm 62 is a wavy portion approximately along the circle 77 of the intersecting line. This bending or undulating strip straddles the inside and the outside sections of the circle 77 of the intersecting line due to the existence of the wave as represented by the curved line 76 in FIG. 4. It will be appreciated that the position of the wave band 76 changes in the radial direction, as the diameter of the circle 77 of the intersecting line is increased or decreased due to the movement of the piston 46. The change in position is caused when the diaphragm is deformed into a wave form which tends to be pushed into the existing space between the fins 64 and 65 so that a relatively large deformation resistance is encountered. This deformation resistance is added to the displacement resistance of the piston 46 so that the ability of the output air pressure to quickly respond to the control air pressure is hindered which is a disadvantage.

OBJECTS AND SUMMARY OF THE INVENTION

Therefore, it is an object of this invention to reduce the deformation resistance due to the change of the radial position of the circular wave band and, in turn, the displacement resistance of the piston, by eliminating the undulating deformation of the diaphragm which is caused by direct contact with the first and second fins.

A further object of this invention is to provide a protective member having a spiral or concentric configuration which is relatively displaced and moved in the axial direction along the center line between the adjoining parts in the radial direction. The protector is placed concentrically to the piston main body between the upper edges of the first fins and the second fins and the adjacent surface of the balance diaphragm of the pressure control valve.

The protection member is located between the upper edges of the first fins and the second fins and is contiguous to the adjacent side of the diaphragm. The diaphragm is biased toward the protection member by the air pressure so that the protection member is pushed toward the adjacent edges of the first fins and the second fins. The protection member rests on the upper edges of the first fins and the second fins and is either a spiral or a concentric wire arrangement so that it is not adversely affected by the existence of the V-groove formed between the first fins and the second fins. The wire protector takes the form in which it completely matches the part of the first surface which connects the upper edges of the first fins on the adjacent side of the diaphragm with the part of the second surface which connects the upper edges of the second fins on the side adjacent to the diaphragm. The diaphragm is pushed onto this protection member and assumes a shape which completely matches the part of the first surface and the part of the second surface. When the wave form deformation exists, the fins and the space between them is eliminated. Thus, the curved part void corresponding to the circle of the intersecting line, and the curvature of the curved portion becomes a simple plane circle. When the diameter of the circle of the intersecting line changes due to the displacement of the piston, the protection member changes accordingly so that the diaphragm changes accordingly. Since the wave form does not have the deformed portion, the diaphragm exhibits a low deformation resistance so that the displacement resistance of the piston is relatively low.

In accordance with the present invention there is provided a railway car pressure control valve comprising, an adjustable middle body member having an air supply chamber, an air supply valve and a valve seat, the air supply chamber is connected to a source of compressed air, an output chamber is connectable to an output passage, an exhaust chamber is opened to the atmosphere, the valve seat located in an air supply passage connects the air supply chamber to the output chamber, the air supply valve is biased by a spring toward the valve seat, an exhaust valve rod having a valve tip which faces the air supply valve and fits loosely in the air supply passage and having an exhaust passage which has one end open at the valve tip and which has the other end open to the exhaust chamber, a control piston having a center portion attached to an inner periphery of a control piston diaphragm, the control piston diaphragm having an outer periphery fixed to the inside wall of a valve main body for defining a control chamber, a source of control air pressure connected to the control chamber to provide a pressure force to move the exhaust valve rod in the direction of the air supply valve, a balance piston having a center portion attached to an inner periphery of a balance piston diaphragm, the balance piston diaphragm having an outer periphery fixed to the inside wall of the valve main body for defining a balance chamber which receives the air pressure from the output chamber proving a balancing force to resist the pressure force in the control chamber, a first and second plurality of radially extending interleaved fins and a protective member interposed between one of the balance and control piston diaphragms and the radially extending interleaved fins to reduce the deformation resistance of the one diaphragm.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
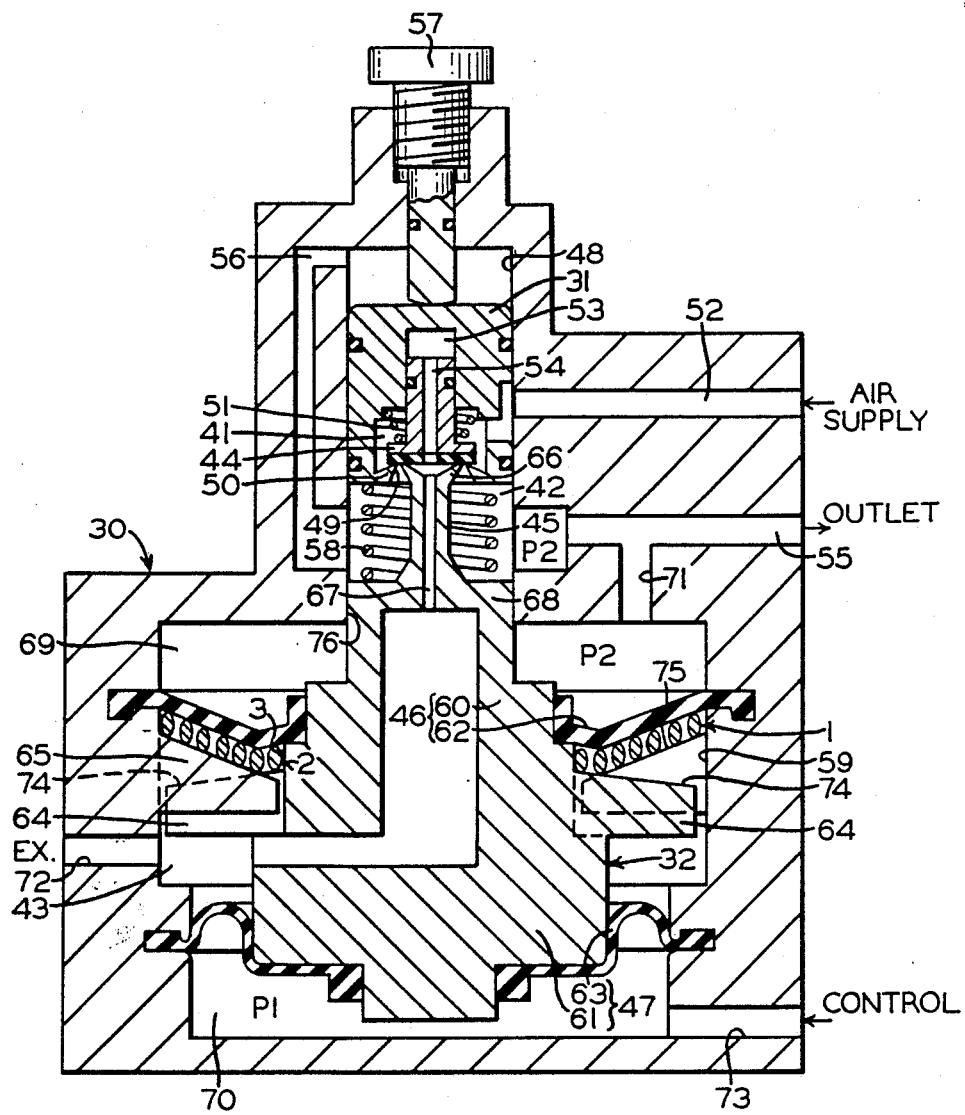
FIG. 1 is a vertical cross-sectional frontal view showing the details of the pressure control valve structure of one embodiment of the present invention.

Referring now to the drawings, and in particular to FIG. 1, there is shown a preferred embodiment which will be presently explained. The pressure control valve shown in FIG. 1 includes a middle body member 31 and a piston element 32 located in the main valve body 30. In FIG. 1, there is shown an air supply chamber 41, an output chamber 42, an exhaust chamber 43, an air supply valve 44, an exhaust valve rod 45, a balance piston 46, and a control piston 47.

Figure 2:
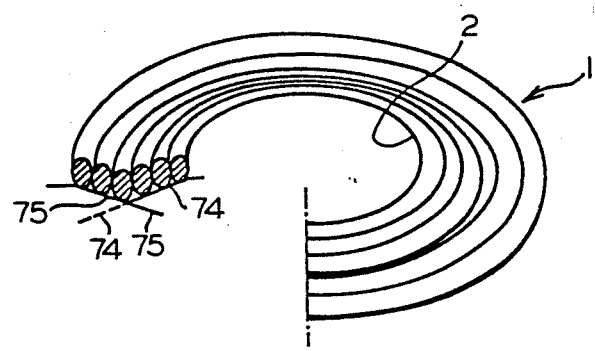
FIG. 2 is a partial cross perspective view of the protective member used in the valve of FIG. 1.
Figure 4:
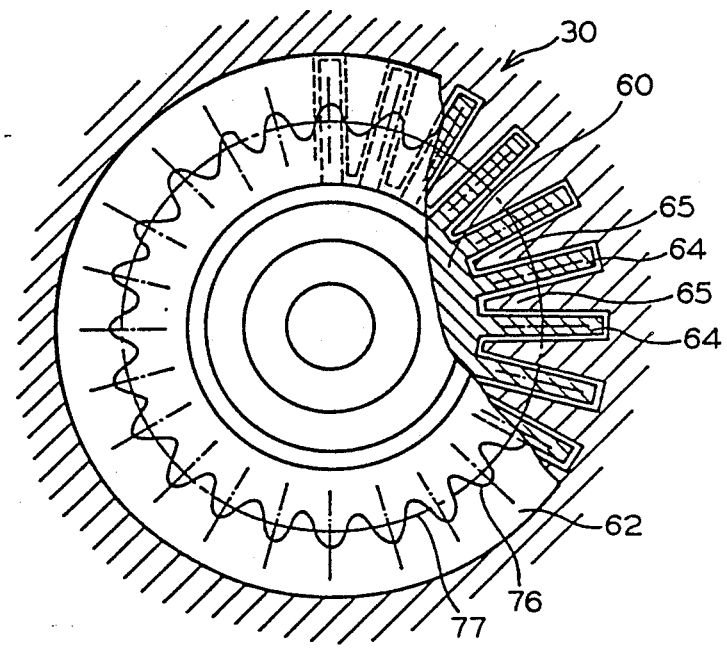
FIG. 4 is a partial cross-sectional view taken along line A—A of FIG. 3.
Figure 3:
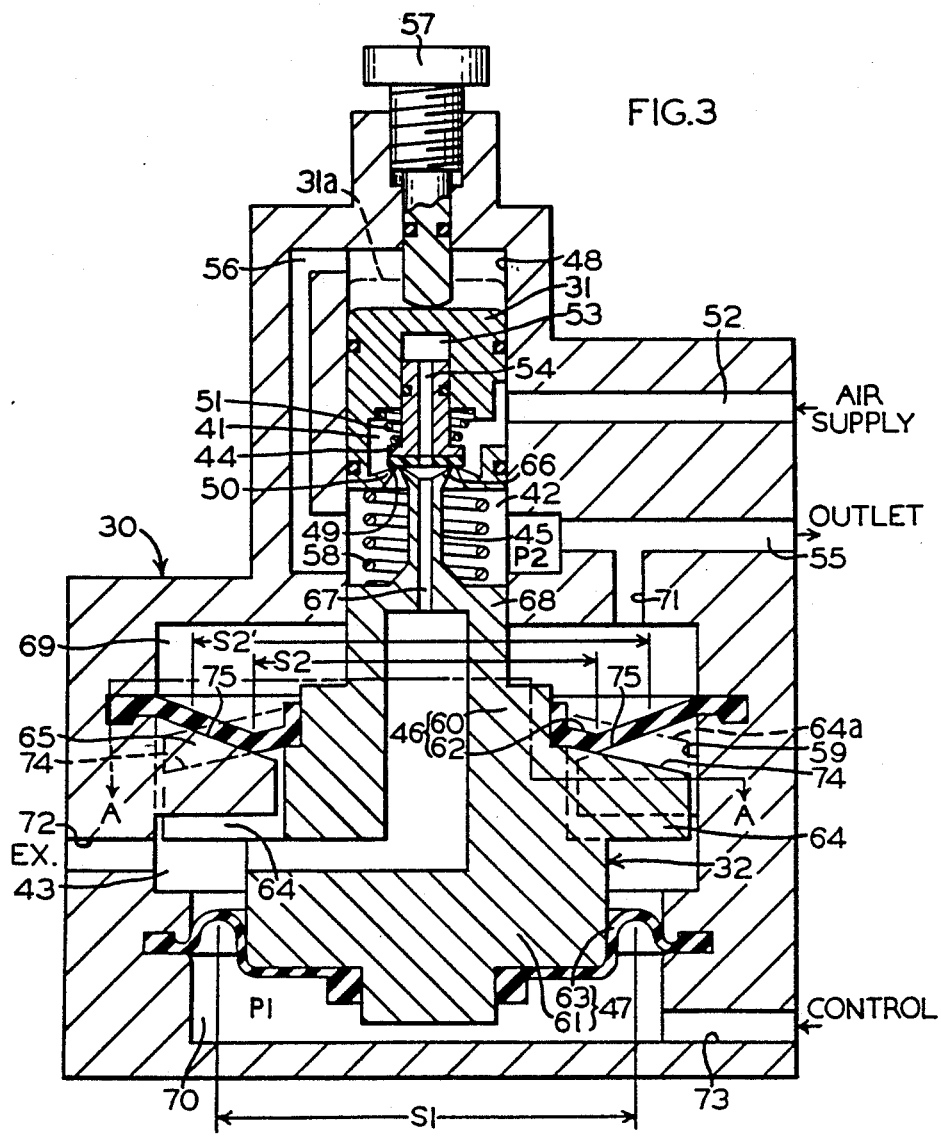
FIG. 3 is a partial vertical cross-sectional frontal view of an embodiment of the pressure control valve shown and disclosed in copending U.S. patent application Ser. No. 07/278,518.

The pressure control valve of FIG. 2 is similar to that shown in FIG. 3, but is combined with a unique protection member 1. The other parts of the present valve are substantially the same and are identified with the same reference numbers, and therefore, a detailed explanation has been omitted for the purpose of convenience.

As shown, in FIGS. 1 and 2, the protection member 1 is formed from a suitable metal wire, such as piano wire or the like. The piano wire has an oval cross section. The piano wire is a steel wire which has a high tensile strength and has a thickness that is even throughout its length. The wire is formed into a spiral concentric configuration. It has a central circular hole 2 which fits around the predetermined intermediate circumferential portion of the balance piston main body 60. The outside or outer turn snugly fits against the inner hole 59 of the main valve body 30. The distance or space between the adjacent turns of the spiral in the radial direction is close enough but not too close to allow the turns to easily move in the direction along the center axial line of the piston.

The inner turn of the center circular hole 2 of the protection member 1 snugly fits the outer circumferential wall portion 3 formed on the balance piston main body 60 between the diaphragm 62 of the balance piston 46. Thus, the protector 1 is disposed between the first and second fins 64 and 65 and the diaphragm 62.

Now when the pressure control valve is in the overlap condition, as shown in FIG. 1, the air pressure in the balance chamber 69 acts on the upper surface of the diaphragm 62 so that the protection member 1 is pressed onto the inner center section of the first surface area which is formed by the upper slanted edges 74 of the first fins 64 and onto the outer section of the second surface area which is formed by the upper slanted edges 75 of the second fins 65. If the main piston 32 moves upwardly so that the relative position between the first fins 64 and the second fins 65 changes, the area of the first surface area increases while the area of the second surface decreases. It will be appreciated that contact between protection member 1 and the diaphragm 62 remains unchanged but the cross-sectional shape of the protector 1 and the diaphragm 62 is changed as a function of this lifting movement. Because of the rigidity of the protection member 1 the diaphragm 62 is not undulated since the wire protector 1 makes up for the space between the first fins 64 in the first surface and also for the space between the second fins 65 in the second surface. Thus, the wire protection member 1 prevents the diaphragm 62 from becoming wavy by the spaces between each of the fins. In this manner, the deformation of the diaphragm 62 is averted due to the change in the position of the main piston 32. The change of the position simply results in the change of the circular curvature corresponding to the position of the circle of the intersection of the first surface and the second surface. Thus, the deformation resistance of the diaphragm 62 remains relatively low. In addition, the movement of the protection member 1 is a shift to the position of the line 77 which corresponds to the position of the circle of the intersection of the first surface and the second surface. The spiral center line caused by this position shifting results in an extremely small flexure or torsion distortion of the line so that the deformation resistance remains relatively low.

Therefore, in the subject pressure control valve, there is a very low resistance with a change in the position of the fins when the main piston 32 moves in either direction.

In the above embodiment, the protection member 1 may be a simple circular or spiral shape, but if desired, it can take the form of concentric circles by placing the circular rings having different larger diameters starting from the center ring. In addition, the cross-section of the wire is shown as being oval shaped, but it is understood that the wire can have a circular cross-section or a rectangular cross-section with rounded corners as well as other cross-sections. In addition, while the metal piano wire was used in the preferred embodiment, it can be replaced with suitable plastic or a composite material of plastic and metal as well as other materials.

Even if the spiral or concentric wave-shape is generated on the diaphragm because of using the wire for the protection member, this does not increase the deformation resistance of the diaphragm.

By means of the subject invention, the response of the pressure control valve is improved since the presence of the protection member does not modify the resistance with changes in the position of the main piston 32.

The following is a nomenclature list of components or elements shown and disclosed in the drawings and specification of the subject invention:

1. protection member
2. circular hole
3. outer circumferential wall portion
30. main valve body
31. middle body
32. main piston
41. air supply chamber
42. outlet chamber
43. exhaust chamber
44. air supply chamber
45. exhaust valve rod
46. balance piston
47. control piston
48. vent chamber
49. air supply hole
50. valve seat
51. compression biasing spring
52. supply passage
53. back vent chamber 54. central vent passage
55. delivery passage
56. vent passage
57. adjusting screw
58. biasing spring
59. internal opening
60. balance piston position
61. control piston portion
62. diaphragm of balance piston
63. diaphragm of the control piston
64. first radially extending fins
65. second radially extending fins
66. valve tip
67. exhaust port
68. lower collar
69. balance chamber
70. control chamber
71. connecting passage
72. exhaust passage
73. control passage
74. upper edge of the first fins
75. upper edge of the second fins
76. curved line
77. circle of the intersecting line of the first surface and the second surface.

Thus, the present invention has been described in such full, clear, concise and exact terms as to enable any person skilled in the art to which it pertains to make and use the same, and having set forth the best mode contemplated of carrying out this invention. I state that the subject matter, which I regard as being my invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

I claim:

1. A railway car pressure control valve comprising, an adjustable middle body member having an air supply chamber, an air supply valve and a valve seat, the air supply chamber is connected to a source of compressed air, an output chamber is connectable to an output passage, an exhaust chamber is opened to the atmosphere, the valve seat located in an air supply passage connects the air supply chamber to the output chamber, the air supply valve is biased by a spring toward the valve seat, an exhaust valve rod having a valve tip which faces the air supply valve and fits loosely in the air supply passage and having an exhaust passage which has one end open at the valve tip and which has the other end open to the exhaust chamber, a control piston having a center portion attached to an inner periphery of a control piston diaphragm, the control piston diaphragm having an outer periphery fixed to the inside wall of a valve main body for defining a control chamber, a source of control air pressure connected to the control chamber to provide a pressure force to move the exhaust valve rod in the direction of the air supply valve, a balance piston having a center portion attached to an inner periphery of a balance piston diaphragm, the balance piston diaphragm having an outer periphery fixed to the inside wall of the main valve body for defining a balance chamber which receives the air pressure from the output chamber providing a balancing force to resist the pressure force in the control chamber, a first and second plurality of radially extending interleaved fins connected to the main valve body and one of the center portions, respectively, and a protective member interposed between one of the balance and control piston diaphragms and the radially extending interleaved fins to reduce the deformation resistance of the one diaphragm.

2. The railway car pressure control valve as defined in claim 1, wherein the protective member is a circular wire device.

3. The railway car pressure control valve as defined in claim 1, wherein the first plurality of radially extending fins are attached to the wall in the main valve body.

4. The railway car pressure control valve as defined in claim 3, wherein the second plurality of radially extending fins are attached to the balance piston.

5. The railway car pressure control valve as defined in claim 2, wherein the protective member includes a plurality of turns of wire in which the inner turn engages the center portion of the balance piston and in which the outer turn engages the inside wall of the main valve body.

6. The railway car pressure control valve as defined in claim 5, wherein the first and second plurality of the radially extending fins have upper slanted surfaces which contact the adjacent surface of the protective member.

7. The railway car pressure control valve as defined in claim 1, wherein the protective member is a spiral wire device.

8. The railway car pressure control valve as defined in claim 2, wherein the circular wire has an oval cross section.

9. The railway car pressure control valve as defined in claim wherein the balance piston diaphragm rests on the protective member to prevent undulated deformation.

10. The railway car pressure control valve as defined in claim 7, wherein the spiral wire has an oval cross section.

* * * * *

UNITED STATES PATENT AND TRADEMARK OFFICE
CERTIFICATE OF CORRECTION

PATENT NO. : 4,949,754

DATED : August 21, 1990

INVENTOR(S) : Hideo Tamamori

It is certified that error appears in the above-identified patent and that said Letters Patent is hereby corrected as shown below:

Column 10, line 48, after "claim" insert --1--

Signed and Sealed this

Twelfth Day of November, 1991

Attest:

HARRY F. MANBECK, JR.

*Attesting Officer*     *Commissioner of Patents and Trademarks*